April 12, 1932. E. N. JACOBI 1,853,162
LOCKING DEVICE
Filed April 3, 1930 2 Sheets-Sheet 1

Inventor
Edward N. Jacobi
By Ira Milton Jones

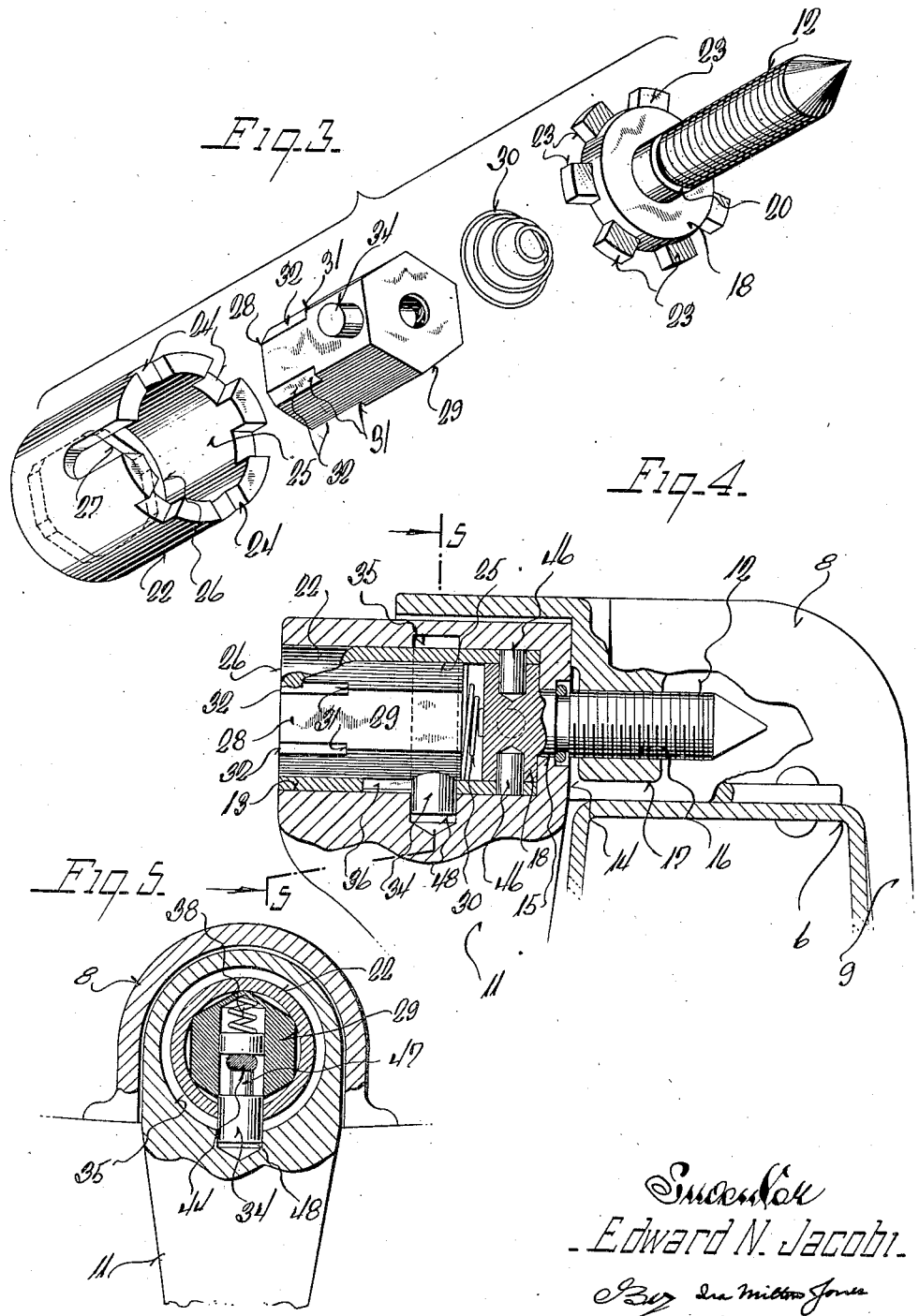

Patented Apr. 12, 1932

1,853,162

UNITED STATES PATENT OFFICE

EDWARD N. JACOBI, OF MILWAUKEE, WISCONSIN, ASSIGNOR TO BRIGGS & STRATTON CORPORATION, OF MILWAUKEE, WISCONSIN, A CORPORATION OF DELAWARE

LOCKING DEVICE

Application filed April 3, 1930. Serial No. 441,255.

This invention relates to certain new and useful improvements in locking devices and refers more particularly to means for securing spare tires against unauthorized removal from their carriers.

It is an object of this invention to provide a threaded stud and a driving member therefor having a disappearing tool engageable portion.

Another object of this invention resides in the provision of a key controlled means for maintaining the tool engageable portion in retracted position preventing the engagement of a tool therewith.

Another object of this invention resides in the provision of key controlled means for securing a tire clamping member in position against unauthorized removal wherein the key controlled means is carried entirely by said clamping member.

Another object of this invention resides in the provision of means for preventing effective rotation of the driving member to release the stud by means of a pointed tool engaged with the outer end of the driving member in the event the tool engaging portion is retracted.

And a further object of this invention is to provide a simple and effective key controlled means for preventing unauthorized movement of a securing stud.

With the above and other objects in view which will appear as the description proceeds, my invention resides in the novel construction, combination and arrangement of parts substantially as hereinafter described and more particularly defined by the appended claim, it being understood that such changes in the precise embodiment of the hereindisclosed invention may be made as come within the scope of the claim.

In the accompanying drawings, I have illustrated two complete examples of the physical embodiment of my invention constructed according to the best modes I have so far devised for the practical application of the principles thereof, and in which:

Figure 3 is a detail perspective view of the various elements of the device shown separated and arranged in their proper order of assembly;

Figure 4 is a view similar to Figure 1 of a slightly modified form of my invention, and Figure 5 is a cross sectional view taken through Figure 4 on the plane of the line 5—5.

Figure 1:
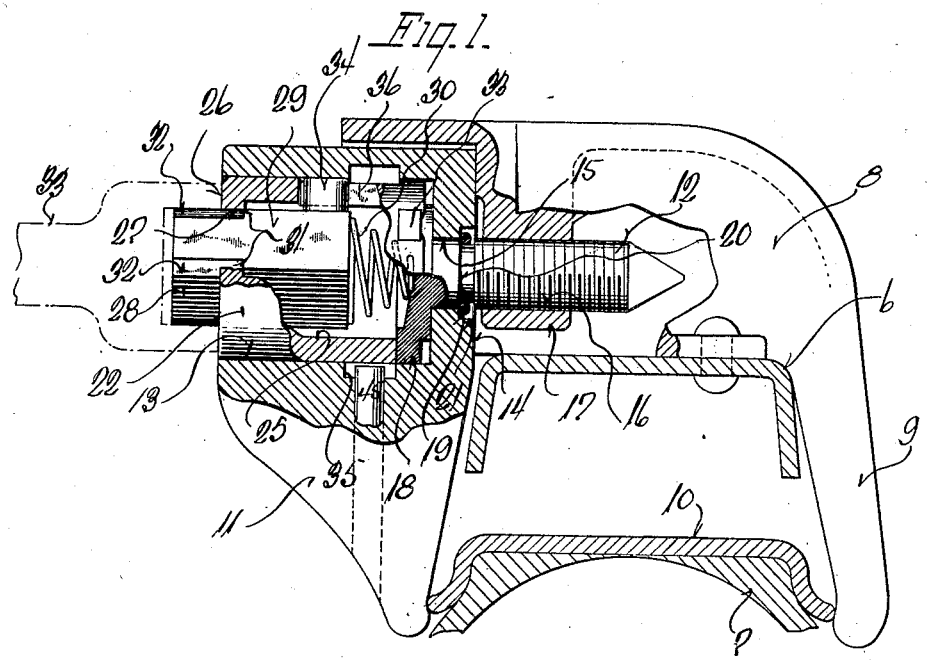
Figure 1 is a sectional view through a portion of the tire carrier and tire, illustrating my invention applied thereto.

Referring now more particularly to the accompanying drawings in which like numerals designate like parts throughout the several views, the numeral 6 represents a portion of a conventional tire carrier upon which a tire 7 is adapted to be mounted in the usual manner. Secured to the carrier 6 is a member 8 from the rear end of which a foot 9 extends downwardly to provide an abutment at its lower end against which the tire rim 10 is held by means of a clamping member 11 detachably secured to the member 8.

Heretofore, it has been customary to secure the member 11 in clamping position by passing a stud through an aperture in the member 11 to be threaded in the member 8. In such instances, the member 11 usually had a cavity in which the head of the stud was received, the entrance to the cavity being closed by a lock cap. This construction has been objectionable in that the various elements were disconnected, and for this reason the lock cap often was accidentally or intentionally left off.

The present invention eliminates this and other objectionable features of existing tire locking devices by providing a stud 12 of novel construction which is positively connected with the clamping member, and has key controlled means also carried by the clamping member and through which rotation is imparted to the stud.

To accommodate this structure, the clamping member 11 has a cylindrical well 13 extending transversely into its upper end with the bottom of the well terminating short of its inner wall 14. The stud 12 projects through an aperture 15 in the bottom of the well and is adapted to be threaded into a suitable opening 16 formed in a downwardly extending lug 17 carried by the member 8 to, upon being drawn tight, hold the member 11 in clamping position with the upper end of its inner face 14 abutting the lug 17 and its lower end engaging the tire rim 10.

The stud is freely rotatably held against axial movement in its aperture 15 by the engagement of its enlarged head 18 with the bottom of the well 13 and by a spring ring 19 mounted in an annular groove 20 in the stud and a counterbore 21 projected from the inner face 14 of the clamping member 11.

To enable the stud to be turned, its enlarged head 18 has a cylindrical cup shaped casing 22 secured thereto by having a plurality of radial lugs 23 extended from the head 18 received in correspondingly located recesses 24 formed in the peripheral edge of the cup shaped casing 22 to be secured therein by swedging the edges of the recesses 24 over the lugs 23.

The bore 25 of the cup shaped casing is cylindrical and its bottom wall 26, the outer face of which is preferably aligned with the front of the clamping member 11 has a hexagonal opening 27 through which the outer end 28 of a lock cylinder mounting member 29, of hexagonal shape in cross section, is projectable.

The mounting head 29 is of hexagonal cross section and of substantially the same size across the corners as the diameter of the bore 25 in which its major portion is slidably disposed. An expansive spring 30 confined between the enlarged head 18 of the stud and the inner end of the lock cylinder mounting member 29 normally yieldably urges the same outwardly of the casing, complete ejection of the mounting head 29 by the spring 30 being prevented by the engagement of shoulders 31 formed by cutting away the corners of its hexagonal outer surface at its outer end 28, as at 32, with the inner surface of the casing bottom 26 whose aperture 27 is shaped to correspond to the cross sectional shape of the mounting member outer end 28.

The outer end of the mounting member being substantially of hexagonal shape provides a tool engageable portion with which a wrench 33 or other similar tool may be engaged to impart rotation to the stud through the casing 22, as will be readily apparent. However, the mounting member 29 is axially movable to have its tool engageable end 28 retracted entirely within the casing 22 to prevent the engagement of a tool therewith, and is adapted to be held in such retracted position by the engagement of a locking bolt 34 carried by the lock cylinder mounting member in an annular channel 35 formed in the member 11 in communication with its well 13, an elongated opening 36 in the casing 22 accommodating the extended end of the bolt.

Figure 2:
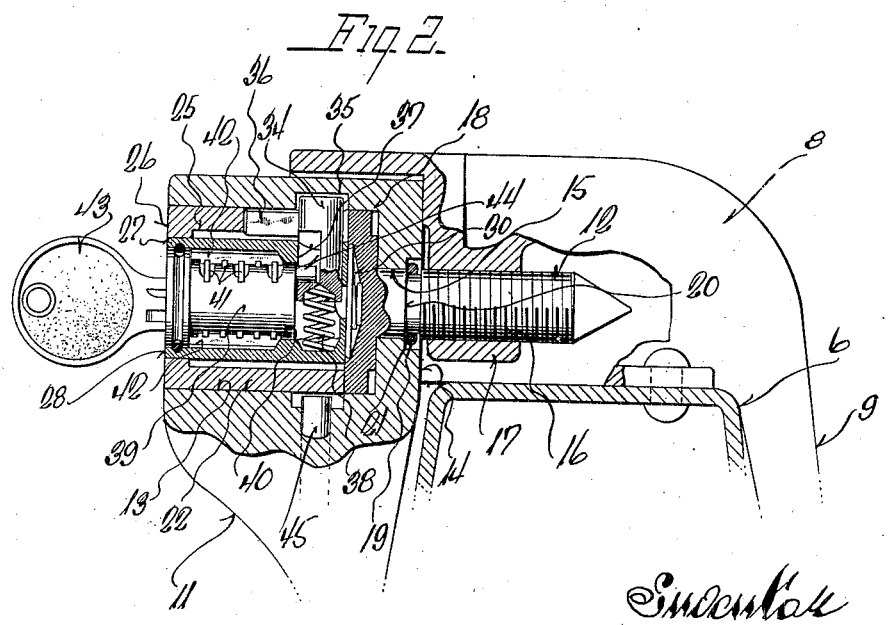
Figure 2 is a view similar to Figure 1 showing the key controlled mechanism in section and the parts in locked position.

As best illustrated in Figure 2, the locking bolt 34 is slidably mounted in a transverse opening 37 formed in the inner end of the lock cylinder mounting member 29, in the bottom of which a spring 38 is disposed to yieldably urge the bolt outwardly to locking position. The bolt 34 is retractible to inactive position by a lock cylinder 39 rotatably mounted in a longitudinal bore 40 in the mounting member 29. The lock cylinder is of conventional construction and has a plurality of locking tumblers 41 which are yieldably urged to engagement with one of a pair of locking grooves 42 in the mounting member and are retractible within the periphery of the cylinder by the insertion of a proper key 43.

A driving cam 44 extended rearwardly from the inner end of the lock cylinder is engageable with the locking bolt 34 so that rotation of the cylinder imparted thereto by the key moves the bolt axially against its urging spring 38 to withdraw its outer end from the annular groove 35 and thus permit the spring 30 to extend the tool engaging portion 28 of the mounting member outwardly to operative position, the elongated opening 36 in the wall of the casing 22 accommodating the movement of the locking bolt with the mounting member 29.

From the foregoing, it is seen that after the stud has been drawn tight, it is merely necessary to push the outer end of the cylinder mounting member into its casing until the locking bolt snaps into the groove 35. At this time the outer faces of the mounting member 29, the casing bottom 26 and the front of the clamping member 11 are substantially flush so that it is impossible to engage a wrench or similar tool with the end of the mounting member which forms the driving element for the stud.

The retraction of the tool engageable end into its casing, however, does not prevent rotation of the stud driving element by the engagement of a sharp tool with either the face of the casing or the mounting member and imparting rotational force thereto by means of a hammer or the like. To prevent actuation of the stud in this manner, a pin 45 is extended upwardly through the clamping member 11 to have its inner end disposed in the annular groove 35 so that as the stud carried assembly is forcibly rotated while locked, the locking bolt 34 abuts the inner end of the pin 45 and thus effectively prevents further rotation of the stud.

In the modification illustrated in Figures 4 and 5, the same general construction is maintained but in place of the radial lugs 23 carried by the head of the stud and the cooperating recesses 24 in the casing inner end, a number of pins 46 are driven radially into aligned apertures in the casing and the head of the stud.

A slightly varied construction of locking bolt is also employed, and in place of the usual slot on one side, the bolt is provided with a central portion 47 of reduced diameter to provide the necessary abutment with which the lock cylinder carried cam 44 engages. The major difference of this construction over that illustrated in Figures 1, 2 and 3 resides in providing a bored depression 48 extending radially from the bottom of the annular groove 35 and in providing additional movement for the locking bolt 34 so that its active end snaps into the depression 48 if rotation is imparted to the stud assembly when the device is in its locked position.

From the foregoing description, taken in connection with the accompanying drawings, it will be readily apparent to those skilled in the art to which an invention of the character described appertains, that I provide a novel and simplified means of preventing unauthorized actuation of a securing stud which is particularly adaptable for use with tire locking devices.

What I claim as my invention is:

In combination with a tire clamping member of the character described, a rotatable stud for securing the same in clamping position, means for imparting rotation to the stud comprising a casing connected therewith and normally freely rotatable within the clamping member, a lock cylinder mounting member slidably mounted in the casing and having a tool engageable portion projectable therebeyond when in one position to permit the engagement of a tool therewith, and means for locking the stud against unauthorized actuation comprising a locking bolt carried by the lock cylinder mounting member and engageable with an abutment carried by the clamping member upon extension of the lock cylinder mounting member into the casing to retract its tool engageable portion, and a second abutment carried by the clamping member with which the locking bolt engages to prevent effective rotation of the casing and the stud.

In testimony whereof I have hereunto affixed my signature.

EDWARD N. JACOBI.